United States Patent
Ertas et al.

(10) Patent No.: US 10,094,335 B2
(45) Date of Patent: Oct. 9, 2018

(54) COMPLIANT SHAFT WITH A RECURSIVE CONFIGURATION FOR TURBINE ENGINES

(71) Applicant: GENERAL ELECTRIC COMPANY, Schenectady, NY (US)

(72) Inventors: Bugra Han Ertas, Niskayuna, NY (US); Kenneth Lee Fisher, Schenectady, NY (US); Donald Albert Bradley, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 351 days.

(21) Appl. No.: 14/960,502

(22) Filed: Dec. 7, 2015

(65) Prior Publication Data

US 2017/0159608 A1 Jun. 8, 2017

(51) Int. Cl.

| F02K 3/06 | (2006.01) |
|---|---|
| F02C 3/10 | (2006.01) |
| F02C 3/107 | (2006.01) |
| F02C 7/36 | (2006.01) |
| F16C 1/08 | (2006.01) |
| F16H 57/00 | (2012.01) |
| F01D 5/02 | (2006.01) |
| F16D 1/033 | (2006.01) |
| F16H 1/28 | (2006.01) |

(52) U.S. Cl.
CPC ............... *F02K 3/06* (2013.01); *F01D 5/026* (2013.01); *F02C 3/10* (2013.01); *F02C 3/107* (2013.01); *F02C 7/36* (2013.01); *F16C 1/08* (2013.01); *F16H 57/0006* (2013.01); *F05D 2230/53* (2013.01); *F05D 2240/60* (2013.01); *F05D 2240/62* (2013.01); *F05D 2260/40311* (2013.01); *F05D 2260/96* (2013.01); *F16D 1/033* (2013.01); *F16H 1/2845* (2013.01)

(58) Field of Classification Search
CPC .... F02C 7/36; F02C 3/107; F02K 3/06; F01D 5/026; F05D 2260/40311; F05D 2230/53; F05D 2240/60
See application file for complete search history.

(56) References Cited

U.S. PATENT DOCUMENTS

| 5,433,674 A | * | 7/1995 | Sheridan | ............... | F16H 1/2809 475/346 |
|---|---|---|---|---|---|
| 7,104,918 B2 | | 9/2006 | Mitrovic | | |

(Continued)

FOREIGN PATENT DOCUMENTS

WO 2014158439 A1 10/2014

OTHER PUBLICATIONS

T. Matsuoka et al., "Light Weight and Low-Misalignment Planetary Gear System for Open Rotor Power Gearbox", ASME 2011 International Design Engineering Technical Conferences and Computers and Information in Engineering Conference, vol. 8, Paper No. DETC2011-47342, pp. 1-9, Aug. 28-31, 2011.

*Primary Examiner* — Carlos A Rivera
(74) *Attorney, Agent, or Firm* — GE Global Patent Operation; Nitin Joshi

(57) ABSTRACT

Embodiments of a compliant shaft for engines are provided herein. In some embodiments, a compliant shaft for a turbine engine may include: a body having a first end configured to be coupled to a shaft of a turbine and a second end coupled to a gear of a gear box, wherein at least a portion of the body is flexible.

14 Claims, 3 Drawing Sheets

(56) References Cited

U.S. PATENT DOCUMENTS

| | | | |
|---|---|---|---|
| 7,591,754 B2 * | 9/2009 | Duong | F16D 3/72 |
| | | | 464/79 |
| 8,585,539 B2 | 11/2013 | Sheridan et al. | |
| 8,899,915 B2 | 12/2014 | McCune et al. | |
| 8,967,950 B2 | 3/2015 | Charier et al. | |
| 8,968,148 B2 | 3/2015 | Matsuoka et al. | |

\* cited by examiner

COMPLIANT SHAFT WITH A RECURSIVE CONFIGURATION FOR TURBINE ENGINES

BACKGROUND

The field of the disclosure relates generally to turbine engines, and more particularly, to a compliant shaft element for turbine engines.

Conventional turbine engine configurations having separate components coupled to a common shaft may require different rotational speeds to perform a desired function. For example, a turbine may have a required rotational speed that is significantly higher that a required rotational speed of a fan. To accommodate for this difference in speed a gear box (e.g., a power gear box (PGB)) may be utilized between the fan and low pressure turbine to allow each of the components to operate at different speeds. However, due to loads imposed on the components of the turbine engine during operation (e.g., various stages of flight), such gear box configurations may suffer from misalignments between one or more shafts coupling the fan to the gear box and the gear box to the low pressure turbine. Such misalignments may cause unfavorable operating conditions internally within the gear box, thereby leading to excessive wear or premature failure of components of the gear box or other ancillary components (e.g., bearings).

To mitigate such misalignments, conventional turbine engines may utilize a plurality of bolted flanges or splines to provide flexibility to the shafts, thereby preventing or correcting the misalignments. However, the inventors have observed that such solutions require the use of multiple separate components (e.g., flanges, bolts and the like), thereby adding complexity and/or weight to the engine.

Therefore, the inventors have provided a compliant shaft for turbine engines.

BRIEF DESCRIPTION

Embodiments of a compliant shaft for turbine engines are provided herein. In some embodiments, a compliant shaft for a turbine engine may include: a body having a first end configured to be coupled to a shaft of a turbine and a second end coupled to a gear of a gear box, wherein at least a portion of the body is flexible.

In some embodiments, a turbine engine may include: a fan having a fan shaft; a shaft rotatably coupling a turbine to a compressor; a gear box rotatably coupling the shaft to the fan shaft; a compliant shaft coupling the shaft to the gear box, comprising: a body having a first end configured to be coupled to a shaft of a turbine and a second end coupled to a gear of a gear box, wherein at least a portion of the body is flexible.

The foregoing and other features of embodiments of the present invention will be further understood with reference to the drawings and detailed description.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of a compliant shaft for turbine engines are provided herein. In at least some embodiments, the inventive compliant shaft may advantageously provide one or more degrees of flexibility between shafts coupling the fan to the gear box and the gear box to the low pressure turbine, thereby preventing or correcting misalignments within the gear box caused by loads imposed on the engine during various stages flight. In some embodiments, the compliant shaft may be advantageously integrally formed with one or more components of the gear box, thereby providing the aforementioned benefits while reducing a number of components that would otherwise be present in the engine, thus reducing complexity and weight of the engine.

Figure 1:
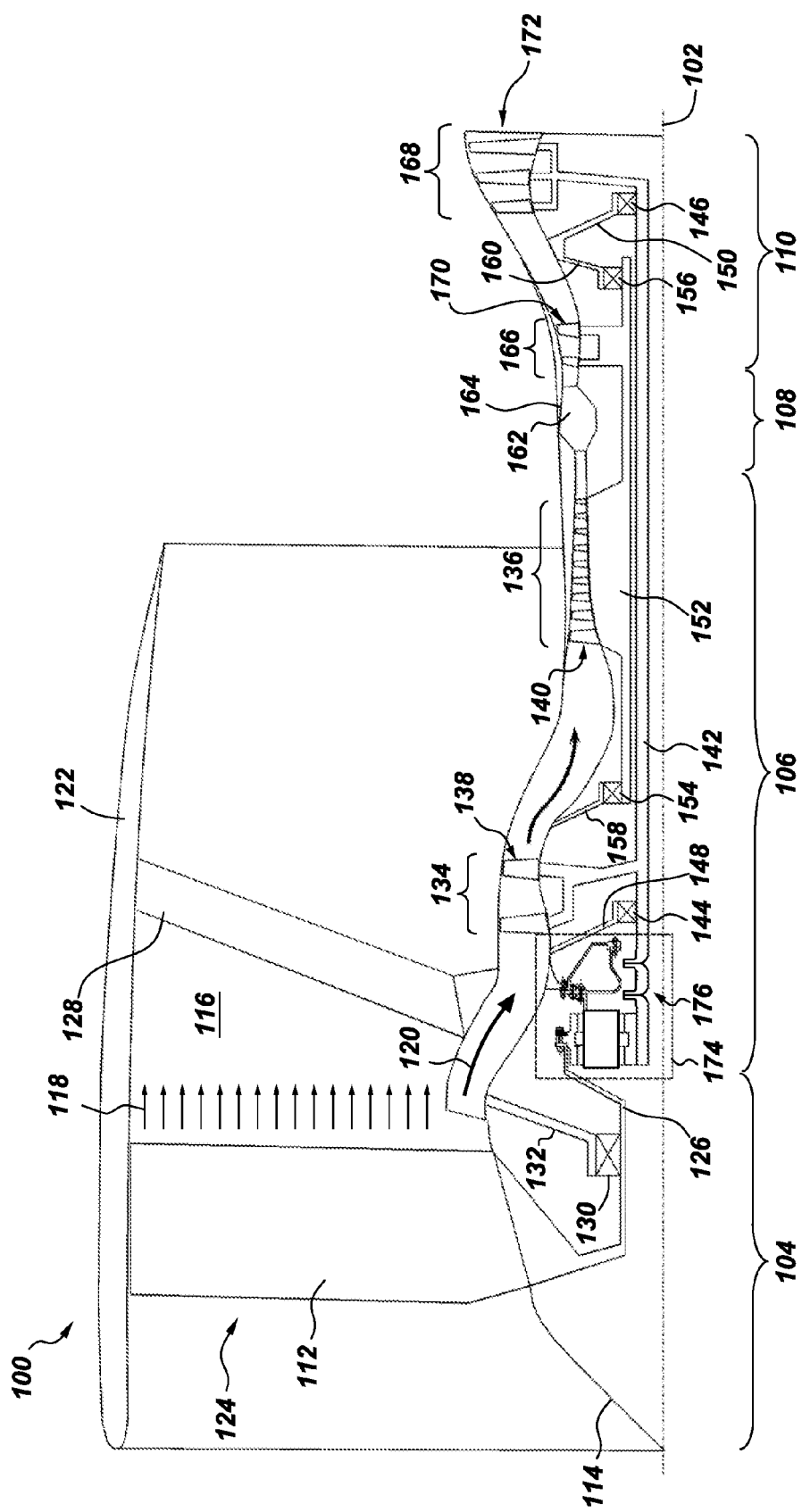
FIG. 1 is a partial schematic view of an engine in a accordance with some embodiments of the present invention.

FIG. 1 is a partial cross sectional view of an engine 100. In the exemplary embodiment, the engine 100 is a gas turbine engine suitable for use in, for example, aviation or marine applications. Alternatively, the engine 100 may be any other turbine engine and/or turbomachine, including, without limitation, a steam turbine engine, a centrifugal compressor, and a turbocharger. Although only a portion is shown, it is to be understood that the engine 100 may be annular in form, for example about an axis 102. In some embodiments, the engine 100 may generally comprise an air intake section 104, compression section 106, combustion section 108 and turbine section 110.

The air intake section 104 generally comprises a fan 124 having a plurality of fan blades 112 coupled to a hub 114 and a rotatable fan shaft 126. One or more bearings 130 may be disposed between a stationary support 132 and the fan shaft 126 to facilitate rotation of the fan shaft 126 and/or dampen vibrational energy imparted on the fan shaft 126 during operation of the engine 100. The one or more bearings may be any type of bearings suitable for use within the engine 100, for example, such as gas bearings, journal bearings, or the like. In some embodiments, a casing 122 may be disposed about the fan 124 and at least a portion of the engine 100, thereby forming a passage 116 for a flow of air (e.g., bypass air) driven by the fan 124, such as indicated by arrows 118. In such embodiments, the casing 122 may be at least partially supported by a plurality of struts (one strut 128 shown). In operation, the fan 124 draws air into the engine 100, directing at least a portion of the air through the passage 116 and at least a portion of the air into the compressor section 106 (indicated by arrow 120).

The compression section 106 is mechanically and fluidly coupled to the fan section 104 and generally comprises one or more compressors, for example, such as a first compressor (low pressure compressor) 134 and second compressor 136 (high pressure compressor), as shown in the figure.

The first compressor 134 receives the directed air from the air intake section 104 and compresses the air via a plurality of compressor blades, vanes or stages (collectively shown at 138). In some embodiments, the compressor blades 138 may be coupled to a first shaft (low pressure turbine (LPT) shaft) 142 to drive rotation of the compressor blades 138. One or more bearings (a first, or forward end low pressure turbine bearing 144 and a second, or aft end low pressure turbine bearing 146 shown) may be disposed between one or more stationary supports 148, 150 and the LPT shaft 142 to facilitate rotation of the LPT shaft 142 and/or dampen vibrational energy imparted on the LPT shaft 142 during operation of the engine 100. The one or more bearings may be any type of bearings suitable for use within the engine 100, for example, such as gas bearings, journal bearings or the like.

The second compressor 136 receives the compressed air from the first compressor 134 and further compresses the air via a plurality of compressor blades or stages (collectively shown at 140). In some embodiments, the compressor blades 140 may be coupled to a high pressure turbine (HPT) shaft (core shaft) 152 to drive rotation of the compressor blades 140. One or more bearings (a third, or forward end high pressure turbine bearing, 154 and a fourth, or aft end high pressure turbine bearing 156 shown) may be disposed between one or more stationary supports 158, 160 and the HPT shaft 152 to facilitate rotation of the HPT shaft 152 and/or dampen vibrational energy imparted on the HPT shaft 152 during operation of the engine 100. The one or more bearings may be any type of bearings suitable for use within the engine 100, for example, such as gas bearings, journal bearings or the like.

Although only a limited number of compressors and limited number of stages for each compressor are shown in the figure, any number of compressors and/or compressor stages may be present to facilitate suitable operation of the engine 100 for a desired application.

The combustion section 108 receives the compressed air from the second compressor 136, mixes the compressed air with a fuel, and facilitates an ignition of the fuel/air mixture. The combustion section 108 generally includes a combustor 162 having a combustion chamber 164 mechanically and fluidly coupled to the compression section 106 and turbine section 110. The combustor 162 may be any type of suitable combustor known in the art and may include any components (e.g., cowls, swirlers, nozzles, igniters, fuel injectors, or the like) required to facilitate the ignition of the fuel/air mixture as described above.

The turbine section 110 is mechanically and fluidly coupled to the combustion section 108 and generally comprises one or more turbines, for example, such as a first turbine (high pressure turbine) 166 and second turbine (low pressure turbine) 168 as shown in the figure. Although only a limited number of turbines and limited number of stages for each turbine are shown in the figure, any number of turbines and/or turbine stages may be present to facilitate suitable operation of the engine 100 for a desired application.

In some embodiments, the first turbine 166 and second turbine 168 each may comprise a plurality of turbine blades and turbine nozzles, or stages (collectively shown at 170 and 172). With respect to the first turbine 166, the turbine blades 170 may be coupled to the HPT shaft 152, which is coupled to the second compressor 136, as described above. In operation of such embodiments, the first turbine 166 receives the heated air from the combustion section 108 and coverts at least a portion of the thermal energy (e.g., provided by ignition of the fuel/air mixture in the combustion chamber 164) into mechanical rotational energy via the plurality of turbine blades 170. The rotation of the turbine blades 170 causes the HPT shaft 152 to rotate, thereby causing the compressor blades 140 of the second compressor 136 to rotate.

With respect to the second turbine 168, the turbine blades 172 may be coupled to the LPT shaft 142, which is coupled to the first compressor 134, as described above. In some embodiments, the LPT shaft 142 may also be coupled to the fan shaft 126, for example, such as shown in FIG. 1. In operation, the second turbine 168 receives the heated air from the first turbine 166 and coverts at least another portion of the thermal energy into mechanical rotational energy via the plurality of turbine blades 172. The rotation of the turbine blades 172 causes the second shaft 142 and the fan shaft 126 to rotate, thereby causing the compressor blades 138 of the second compressor 134 and the fan 124 to rotate.

Although described above in the context of an engine having a two spool configuration (e.g., a high pressure (HP) spool comprising a HP turbine and HP compressor and low pressure (LP) spool comprising a LP turbine and LP compressor), it is to be understood that the engine may have a three spool configuration having an intermediate spool (e.g., an intermediate spool comprising an intermediate turbine and intermediate compressor).

The inventors have observed that in conventional engine configurations (e.g., such as shown in FIG. 1) separate components coupled to a common shaft may require different rotational speeds to perform a desired function. For example, the second turbine 168 may have a required rotational speed that is significantly higher that a required rotational speed of the fan 124. For example, in some embodiments, the second turbine 168 may have a rotational speed requirement of about 11,000 revolutions per minute (rpm) and the fan 124 may have a rotational speed requirement of about 2,400 to about 3000 rpm. To accommodate for this difference in speed, in some embodiments, a gear box 174 may be utilized to allow each of the components (e.g., the low pressure/second turbine 168 and fan 124) to operate at different speeds. In such embodiments, the gear box (power gear box (PGB)) 174 may couple the LPT shaft 142 to the fan shaft 126, for example, such as shown in FIG. 1. The gear box 174 may be any type of gear box suitable to facilitate coupling the LPT shaft 142 to the fan shaft 126 while allowing each of the second turbine 168 and fan 124 to operate at a desired speed. For example, in some embodiments, the gear box 174 may be a reduction gear box. Utilizing a reduction gear box may enable the comparatively higher speed operation of the second turbine 168 while maintaining fan speeds sufficient to provide for increased air bypass ratios, thereby allowing for efficient operation of the engine 100. Moreover, utilizing a reduction gear box may allow for a reduction in turbine stages that would otherwise be present (e.g., in direct drive engine configurations), thereby providing a reduction in weight and complexity of the engine.

Figure 2:
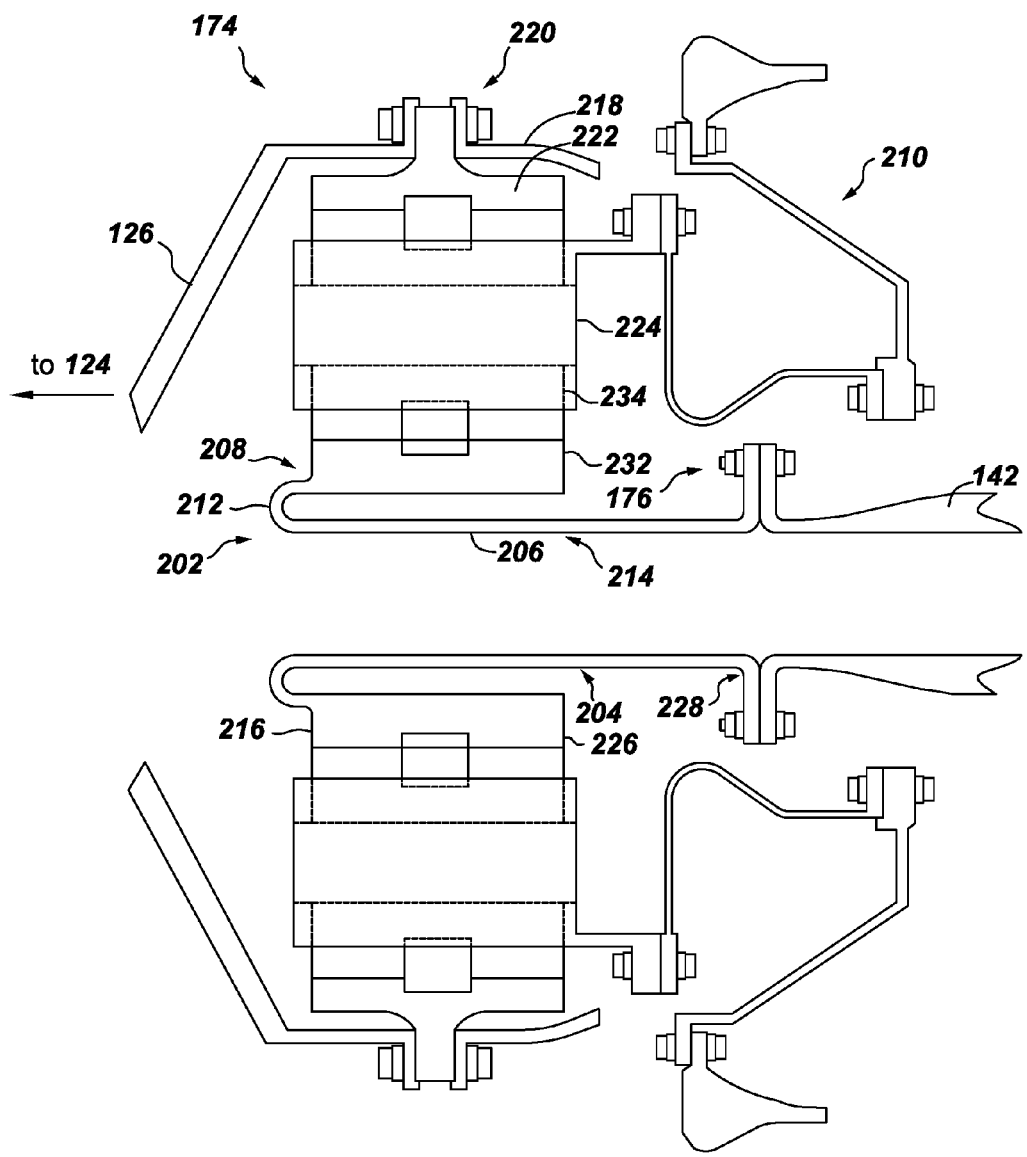
FIG. 2 is a partial cross-sectional view of an exemplary gear box and compliant shaft in accordance with some embodiments of the present invention.

Referring to an exemplary gear box 174 depicted in FIG. 2, in some embodiments, the gear box 174 may generally comprise a plurality of gears (sun gear 232, planet gears 234 and ring gear 222 shown) which function to rotatably couple the LPT shaft 142 to the fan shaft 126. In such embodiments, the planet gears 234 may be statically held in place via a carriage 224. When present, the carriage 224 may be coupled to and/or supported by, one or more structures of the engine 100 (support structure collectively shown at 210). In some embodiments, the ring gear 222 may be coupled to the fan shaft 126, and optionally a ring 218, via a bolted flange 220. In operation, the LPT shaft 142 transmits a rotational force to and/or facilitates rotation of the sun gear 232, which in turn causes rotation of the planet gears 234 and ring gear 222. Such rotation of the ring gear 222 causes rotation of the fan shaft 126 thereby facilitating rotation of the fan 124.

The inventors have further observed that, due to loads imposed on the components of the engine 100 during operation (e.g., various stages of flight), configurations such as described above may suffer from misalignments between one or more shafts coupling the fan 124 to the gear box 174 (e.g., via the fan shaft 126) and the gear box 174 to the low pressure turbine (e.g., the LPT shaft 142). Such misalignments may cause unfavorable operating conditions internally within the gear box 174, thereby leading to excessive wear or premature failure of components (e.g., gears) of the gear box 174 or other ancillary components (e.g., bearings). To mitigate such misalignments, conventional turbine engines may utilize a plurality of bolted flanges or splines (collectively shown at 176) to provide flexibility to the shafts, thereby preventing or correcting the misalignments. However, the inventors have observed that such solutions require the use of multiple separate components (e.g., flanges, bolts and the like), thereby adding complexity and/or weight to the engine.

As such, in some embodiments, the engine 100 or gear box 176 may comprise a compliant shaft 202 coupling one or more shafts (e.g., the LPT shaft 142) to one or more gears (e.g., the sun gear 232) of the gear box 176. The inventors have observed that the inclusion of the compliant shaft 202 may advantageously provide one or more degrees of flexibility between the shafts coupling the gear box to the low pressure turbine (e.g., the LPT shaft 142), thereby preventing or correcting misalignments within the gear box caused by loads imposed on the engine during various stages flight. In addition, when present, the compliant shaft 202 may reduce or eliminate the need for one or more of the bolted flanges or splines 176 typically utilized to introduce flexibility into the system, thereby providing for a reduction in a number of parts and/or a reduction in weight of the engine.

The compliant shaft 202 may be fabricated from any material suitable to provide the aforementioned flexibility and coupling of the LPT shaft 142 and the sun gear 232 as described above. For example, in some embodiments, the compliant shaft 202 may be fabricated from at least one of steel, titanium, nickel based alloys, combinations thereof, or the like.

The compliant shaft 202 generally comprises a body 204 having a first end 228 configured to be coupled to the LPT shaft 142 (e.g., via the bolted flanges or spline arrangement shown at 176), a second end 208 coupled to the sun gear 232, wherein at least a portion of the body 204 is flexible.

The second end 208 may be coupled to the sun gear 232 via any mechanism suitable to maintain coupling of the two components during operation of the engine 100, for example, via one or more fasteners, bolts, flanges or the like. In some embodiments, the compliant shaft 202 may be integrally formed with at least a portion of the sun gear 232, thereby providing an integral component comprising the compliant shaft 202 and sun gear 232, such as shown in FIG. 2. In such embodiments, the integral component may be fabricated via any fabrication process, for example such as an electric discharge machining (EDM) process or additive manufacturing process (also known as rapid prototyping, rapid manufacturing, and 3D printing) such as selective laser sintering (SLS), direct metal laser sintering (DMLS), electron beam melting (EBM), diffusion bonding, friction welding, or selective heat sintering (SHS). The inventors have observed that providing the separate components (e.g., compliant shaft 202 and sun gear 232) as a single integral part reduces a total number of parts that would otherwise be utilized in shaft construction and coupling, thereby reducing weight and/or complexity of the system.

The body 204 may be configured in any manner suitable to provide the flexibility as described herein while maintaining an adequate coupling of the LPT shaft 142 to the sun gear 232 to facilitate transmission of rotational motion between the LPT shaft 142 and the sun gear 232 during operation of the engine 100. For example, in some embodiments, the body 204 may comprise a first portion 206 and a first curved portion 212. In such embodiments, the first curved portion 212 is coupled to the sun gear 232 and the first portion 206, thereby facilitating a coupling between the first portion 206 and the sun gear 232 while providing flexibility.

The first portion 206 may have any shape suitable to provide the flexibility as described herein. For example, in some embodiments, the first portion 206 may be substantially straight or linear when in an un-flexed state, such as shown in FIG. 2. Alternatively, or in combination, at least part of the first portion 206 may be tapered, flared, or the like.

The compliant shaft 202 may be disposed in any position with respect to the sun gear 232. For example, in some embodiments, the body 204 may be disposed radially inward from the sun gear and/or at least partially disposed within a center hole 214 of the sun gear 232, such as shown in FIG. 2. In such embodiments, the first portion 206 may be disposed through the center hole 214 such that the first end 228 of the body 204 is disposed proximate a first side 226 of the sun gear 232 and the second end 208 of the body 204 is disposed proximate a second side 216 of the sun gear 232. In addition, in such embodiments, the first curved portion 212 may be coupled to the sun gear 232 proximate the second side 216 of the sun gear 232.

Figure 3:
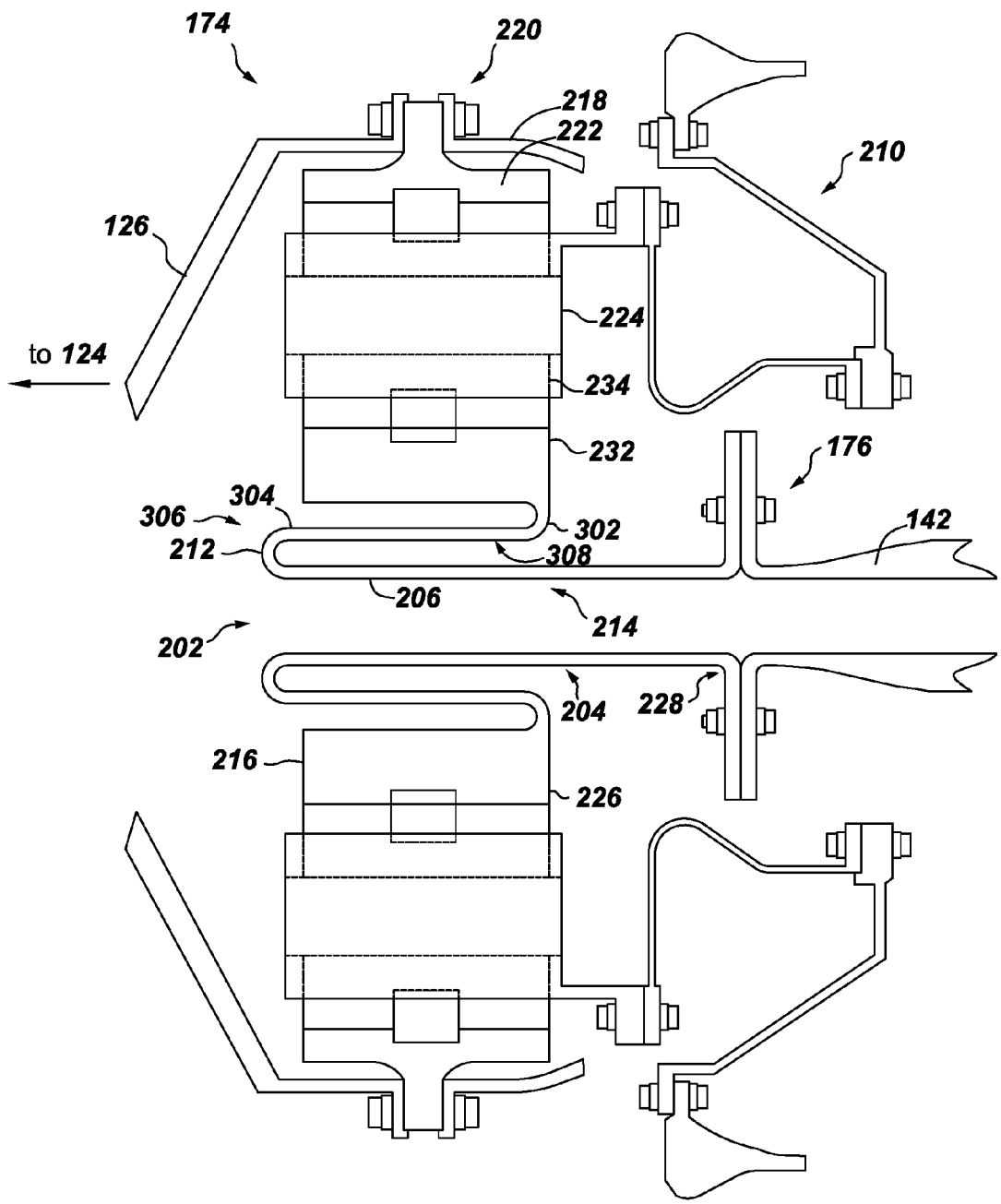
FIG. 3 is a partial cross-sectional view of an exemplary gear box and compliant shaft in accordance with some embodiments of the present invention.

Referring to FIG. 3, in some embodiments, the compliant shaft 202 may be configured in a recursive or undulating pattern. For example, in some embodiments, the complaint shaft 202 may further comprise a second portion 304 and a second curved portion 302 disposed such that the complaint shaft 202 forms a recursive or undulating pattern, such as shown in FIG. 3. In such embodiments, the second portion 304 is coupled to the first curved portion 212 at a first end 306 of the second portion 304 and the second curved portion 302 is coupled to the second portion 304 at a second end 308 of the second portion 304. In addition, in such embodiments, the second curved portion 302 is coupled to the sun gear 232 proximate the first side 226 of the sun gear 232. The inventors have observed that such undulating or recursive configurations may advantageously provide an increased compliance and/or flexibility while not sacrificing significant radial/axial space. Although shown as only having two undulations, the compliant shaft 202 may comprise any number of undulations suitable to provide a desired amount of compliance and/or flexibility to the system.

In any of the above embodiments, each component or element of the compliant shaft 202 (e.g., the first portion 206, second portion, first curved portion 212, second curved portion 302, or the like) may individually, or in combination, provide at least a portion of a desired flexibility provided by the compliant shaft 202 as a whole. Moreover, the compliant shaft 202 may comprise varying magnitudes of flexibility at various positions across the compliant shaft 202.

Thus, embodiments of a compliant shaft for turbine engines has been provided herein. Ranges disclosed herein are inclusive and combinable (e.g., ranges of "about 2 mils and about 100 mils", is inclusive of the endpoints and all intermediate values of the ranges of "about 2 mils and about 100 mils," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "some embodiments", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A compliant shaft for a turbine engine, comprising:
a body having a first end configured to be coupled to a shaft of a turbine and a second end coupled to a sun gear of a gear box, wherein at least a portion of the body prevents or corrects misalignments within the gear box caused by loads imposed on the turbine engine, wherein the body comprises:
a first portion extending from the first end;
a first curved portion extending from the first portion;
a second portion extending from the first curved portion; and
a second curved portion extending from the second portion to the second end, wherein the first portion, first curved portion, second portion and second curved portion form a recursive pattern disposed radially inward from the sun gear.

2. The compliant shaft of claim 1, wherein the body is integrally formed with the sun gear of the gear box.

3. The compliant shaft of claim 2, wherein the first portion, first curved portion, second portion and second curved portion are all disposed within a center hole of the sun gear.

4. The compliant shaft of claim 3, wherein the body is disposed through the center hole of the sun gear such that the first end of the body is disposed proximate a first side of the sun gear and the second end of the body is disposed proximate the first side of the gear.

5. The compliant shaft of claim 1, wherein the gear box is a reduction gear box.

6. The compliant shaft of claim 1, wherein the compliant shaft is fabricated from at least one of steel, titanium or nickel based alloys.

7. The compliant shaft of claim 1, wherein the first portion of the body is substantially straight.

8. A turbine engine, comprising:
a fan having a fan shaft;
a shaft rotatably coupling a turbine to a compressor;
a gear box rotatably coupling the shaft to the fan shaft;
a compliant shaft coupling the shaft to the gear box, comprising:
a body having a first end configured to be coupled to the shaft of the turbine and a second end coupled to a sun gear of the gear box, wherein at least a portion of the body prevents or corrects misalignments within the gear box caused by loads imposed on the turbine engine; wherein the body comprises:
a first portion extending from the first end;
a first curved portion extending from the first portion;
a second portion extending from the first curved portion; and
a second curved portion extending from the second portion to the second end, wherein the first portion, first curved portion, second portion and second curved portion form a recursive pattern disposed radially inward from the sun gear.

9. The turbine engine of claim 8, wherein the body is integrally formed with the sun gear of the gear box.

10. The turbine engine of claim 8, wherein the first portion, first curved portion, second portion and second curved portion are all disposed within a center hole of the sun gear.

11. The compliant shaft of claim 3, wherein the body is disposed through the center hole of the sun gear such that the first end of the body is disposed proximate a first side of the sun gear and the second end of the body is disposed proximate the first side of the gear.

12. The turbine engine of claim 8, wherein the gear box is a reduction gear box.

13. The turbine engine of claim 8, wherein the compliant shaft is fabricated from at least one of steel, titanium or nickel based alloys.

14. The turbine engine of claim 8, wherein the first portion of the body is substantially straight.

* * * * *